US012738182B2

(12) United States Patent
Smith

(10) Patent No.: US 12,738,182 B2
(45) **Date of Patent: *Sep. 15, 2026**

(54) MULTIPURPOSE RECONFIGURABLE DOORBELL GUARD APPARATUS

(71) Applicant: Ryan Dwain Smith, Loxahatchee, FL (US)

(72) Inventor: Ryan Dwain Smith, Loxahatchee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/228,311

(22) Filed: Jun. 4, 2025

(65) Prior Publication Data

US 2025/0292709 A1 Sep. 18, 2025

Related U.S. Application Data

(63) Continuation of application No. 18/941,038, filed on Nov. 8, 2024, now Pat. No. 12,347,345.

(60) Provisional application No. 63/566,454, filed on Mar. 18, 2024.

(51) Int. Cl.
*G09F 7/22* (2006.01)
*G09F 7/18* (2006.01)

(52) U.S. Cl.
CPC ........ *G09F 7/22* (2013.01); *G09F 2007/1873* (2013.01)

(58) Field of Classification Search
CPC ........................... G09F 7/22; G09F 2007/1873
See application file for complete search history.

(56) References Cited

U.S. PATENT DOCUMENTS

| | | | | | |
|---|---|---|---|---|---|
| 2,343,009 | A | | 2/1944 | Albert | |
| 2,447,226 | A | * | 8/1948 | Bennett | H01H 3/20 116/309 |
| 4,130,728 | A | | 12/1978 | Grauel | |
| 4,951,045 | A | | 8/1990 | Knapp et al. | |
| 5,058,523 | A | * | 10/1991 | Mikkonen | B60Q 9/001 116/306 |
| 5,077,452 | A | * | 12/1991 | Mathers | H01H 9/287 220/241 |
| 5,521,578 | A | | 5/1996 | DelValle | |
| 5,673,016 | A | | 9/1997 | Lutes | |
| 5,774,039 | A | | 6/1998 | Housley | |
| D417,853 | S | | 12/1999 | Walker | |
| 6,731,200 | B2 | | 5/2004 | Wagner et al. | |
| 7,336,158 | B2 | | 2/2008 | Lombardo | |
| 11,394,928 | B2 | * | 7/2022 | Pritchett | F16M 13/02 |
| 12,347,345 | B1 | * | 7/2025 | Smith | G09F 7/22 |
| 2006/0220797 | A1 | * | 10/2006 | Valentino | H01H 9/287 200/43.01 |

(Continued)

*Primary Examiner* — David R Dunn
(74) *Attorney, Agent, or Firm* — Dunlap Bennett & Ludwig PLLC

(57) ABSTRACT

A multipurpose reconfigurable doorbell guard apparatus is provided. The doorbell guard apparatus can include a sign, a hinge part, and an attachment interface. The sign can be hingably affixed to the hinge part by connecting a pin of the sign to a plurality of snap-on tabs. The hinge part can be installed within the attachment interface in either of a horizontal or vertical configuration. A user may utilize doorbell guard apparatus to prevent, or allow, operation of aspects of a doorbell. Additionally, a plurality of indicia can be disposed on surfaces of the sign such that at least one message can be provided by the sign.

20 Claims, 5 Drawing Sheets

(56) References Cited

U.S. PATENT DOCUMENTS

| | | | | |
|---|---|---|---|---|
| 2010/0031541 | A1* | 2/2010 | Moyer | H01H 9/287<br>40/299.01 |
| 2010/0164696 | A1* | 7/2010 | Tylicki | G10K 1/26<br>340/396.1 |

* cited by examiner

MULTIPURPOSE RECONFIGURABLE DOORBELL GUARD APPARATUS

CROSS-REFERENCE TO RELATED APPLICATION

This application is a continuation of application Ser. No. 18/941,038, filed Nov. 8, 2024, which claims the benefit of priority of U.S. provisional application No. 63/566,454, filed Mar. 18, 2024, the contents of which are herein incorporated by reference.

BACKGROUND OF THE INVENTION

The present invention relates to doorbell obfuscation apparatuses and, more particularly, to a multipurpose reconfigurable doorbell guard apparatus, configured to prevent a plurality of doorbell types from being operated as desired.

Homes, more frequently, are becoming the central hub of both work and life activities, due in part to work arrangement flexibility such as teleworking. However, with this flexibility there is now even more of a premium on minimizing disruptions from external sources, such as solicitors, visitors, etc. Furthermore, there has been no corresponding decrease in life activities that warrant minimizing disruptions, such as childcare, selfcare, etc. One constant source of home disruption is the doorbell, or door chime, which can disrupt periods of intense concentration, sleep, childcare, etc., causing time inefficiencies, health disruptions, and overall inconvenience.

Traditional mechanisms exist for preventing operation of doorbells, when needed, however, these mechanisms suffer from deficiencies related to fitting only specific doorbell types, block camera lenses, block motion sensors, having to be completely remove during periods of non-use, and limitation on installation configurations, among other issues.

As can be seen, there is a need for a multipurpose reconfigurable doorbell guard apparatus, configured to be doorbell agnostic, having a variety of installation configurations, and being actuatable and having a plurality of functionalities in differing actuated positions.

SUMMARY OF THE INVENTION

In one aspect of the present invention, a reconfigurable doorbell guide apparatus is provided. The reconfigurable doorbell apparatus can include a plurality of components, such as a sign, an anchoring part and a hinge part.

The sign can have a plurality of mounts disposed at each of a plurality of vertices configured to prevent sign from dislodging during actuation. A first pin can have a prism shape, and can be mounted at a first end to a first of the plurality of cylindrical mounts, and at a second end to a second of the plurality of cylindrical mounts. A second pin can also have the prism shape and can be mounted at a first end to a third of the plurality of cylindrical mounts, and at a second end to a fourth of the plurality of cylindrical mounts.

The anchoring part can have a backing plate that can have a fastening means disposed on a first surface thereof, and a hook affixed to the backing plate configured for mounting the apparatus in a horizontal and/or vertical configuration.

The hinge part can have a plurality of surfaces. A plurality of outer snap-on tabs can be affixed to a first of the plurality of surfaces, and each of the plurality of outer-snap-on tools can have an opening defining an inner recessed portion shaped to fit a portion of the prism shape. An inner snap-on tab can be affixed to a second of the plurality of surfaces, and can have an opening defining inner recessed portion shaped to fit a portion of the prism shape. Additionally, the second surface can be non-adjacent to the first surface. A fore guide plate can have a first ridge on the first of the plurality of surfaces extending perpendicular to a longitudinal direction of the first of the plurality of surfaces, and a second ridge on the second of the plurality of surface extending perpendicular to a longitudinal direction of the first of the plurality of surfaces. An aft guide plate can have a first ridge on the first of the plurality of surfaces extending perpendicular to a longitudinal direction of the first of the plurality of surfaces, and a second ridge on the second of the plurality of surface extending perpendicular to a longitudinal direction of the first of the plurality of surfaces.

In another aspect of the present invention, a method of using the reconfigurable doorbell apparatus is provided. A user can determine whether to effectuate a horizontal, or vertical configuration by design. In the case of a horizontal configuration the user can affix the anchoring part to the doorbell such that the hook is facing upward. User can affix sign to hinge part attaching one of the pins to the plurality of snap-on tabs. The user can then press hinge between hook and backing plate of anchoring part utilizing a channel formed by fore guide plate and aft guide plate. Once securely seated, a user can actuate the sign to prevent/allow an individual from utilizing features of the doorbell. In the case of a vertical configuration, a user can affix anchoring part on a structure above the doorbell such that hook is facing upward. User can affix sign to hinge part in the same manner as above. User can then press hinge part between hook and backing plate, such that the hook passed through an aperture in hinge part proximate to aft guide plate. Once securely seated, a user can actuate the sign to prevent/allow an individual from utilizing features of the doorbell. In either configuration, a plurality of differing indica can be provided on two surfaces of the sign such that a first plurality of indicia are displayed to a user when the sign is preventing doorbell operation, and a second plurality of indicia are displayed when the sign is allowing doorbell operation.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is an apparatus for allowing/disallowing operation of a doorbell. The apparatus can include a plurality of components such as an: anchoring part, a hinge part, and a sign part. The anchoring part can include a fastening means for affixing the anchoring part in or of a plurality of locations and/or orientations, and a mounting means for mounting the hinge part thereto in one of a plurality of mounting configurations. The hinge part can have a body shaped such that it can mount to the mounting means in one of a plurality of configurations, and a fastening mechanism configured to hingeably affix the sign. The sign can have a body having a plurality of indicia thereon to communicate at least one message, and a plurality of pins disposed thereon and configured to hingably affix to the fastening mechanism in one of a plurality of display configurations.

Figure 1:
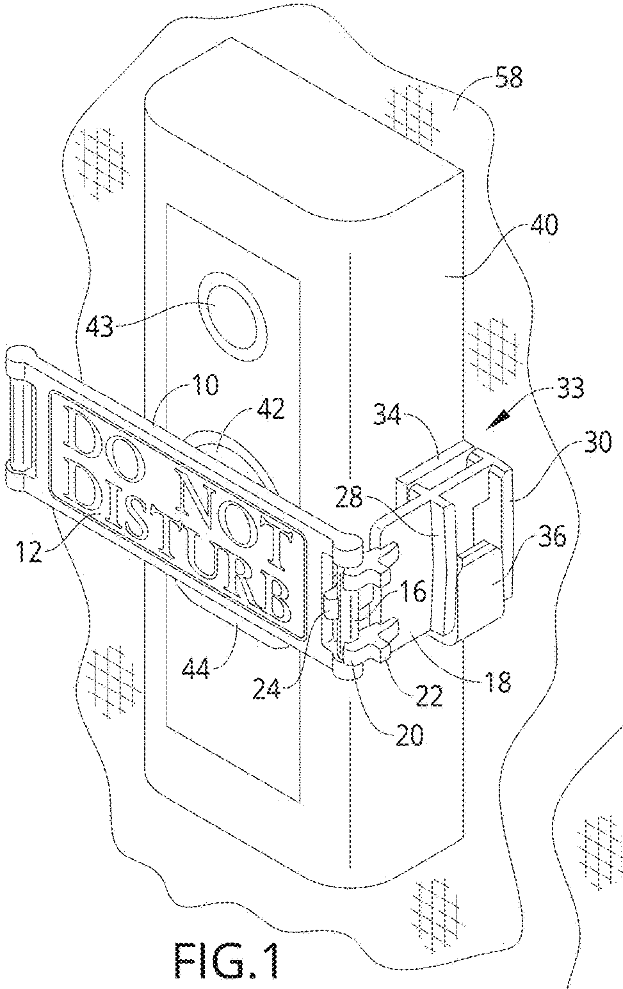
FIG. 1 is a perspective view of an embodiment of a first configuration of a doorbell guard apparatus with sign 10 in a closed position, according to aspects of the present invention.

Referring to FIGS. 1-8, aspects of an embodiment of a doorbell guard apparatus using a horizontal configuration are illustrated. FIG. 1 illustrates a horizontal configuration of a doorbell guard apparatus installed with a smart doorbell. In embodiments, a doorbell, such as smart doorbell 40 can be mounted to a structure 58 and configured to alert an individual of a person's presence. In embodiments, the doorbell can be any type of doorbell but includes at least one device for alerting an individual of a person's presence. In embodiments, smart doorbell 40 can include a plurality of components such as a doorbell alert button 42, a camera 43, and/or a motion sensor 44, which can cause doorbell to alert an individual of a person's presence.

In this configuration doorbell guard apparatus includes an anchoring part 33 having at least a backing plate 34 and a hook 36. In embodiments, to achieve a horizontal configuration backing plate 34 can be affixed to smart doorbell 40, but is not so limited. Hinge part 18 can include a plurality of parts including: a plurality of female mounting interfaces configured to mount hinge part 18 to anchoring part 33 in one of a plurality of orientations, and a plurality of snap-on hinge tabs, such as outer snap-on hinge tabs 20, and inner snap-on hinge tab 24. In embodiments, some of the plurality of female mounting interfaces can be a plurality of guide plates, such as a fore guide plate 28 and an aft guide plate 30. In embodiments, each of the plurality of snap-on hinge tabs can have a rotation stop 22 disposed thereon, and configured to prevent over-rotation of sign part 10. In embodiments, the plurality of parts are continuously formed to form the overall hinge part 18. In embodiments, aft guide plate 30 can be continuously formed to a first end of hinge part 18, and fore guide plate 28 can be continuously formed to a mid-portion of hinge part 18. In embodiments, spacing between fore guide plate 28 and aft guide plate 30 can be sufficient to form a friction fit over hook 36 thereby providing secure attachment. In embodiments, plurality of snap-on hinge tabs can be continuously formed to a second end of hinge part 18, opposite first end, and can be alternatingly aligned to secure pin 16 of sign 10. In embodiments, hinge part 18 can be formed of custom ABS plastic having metallic aesthetics, such as a metallic look, metallic flake, etc. giving it a shiny metallic effect. In embodiments, the custom ABS plastic can be identified by specification number AM10S101.

Figure 2:
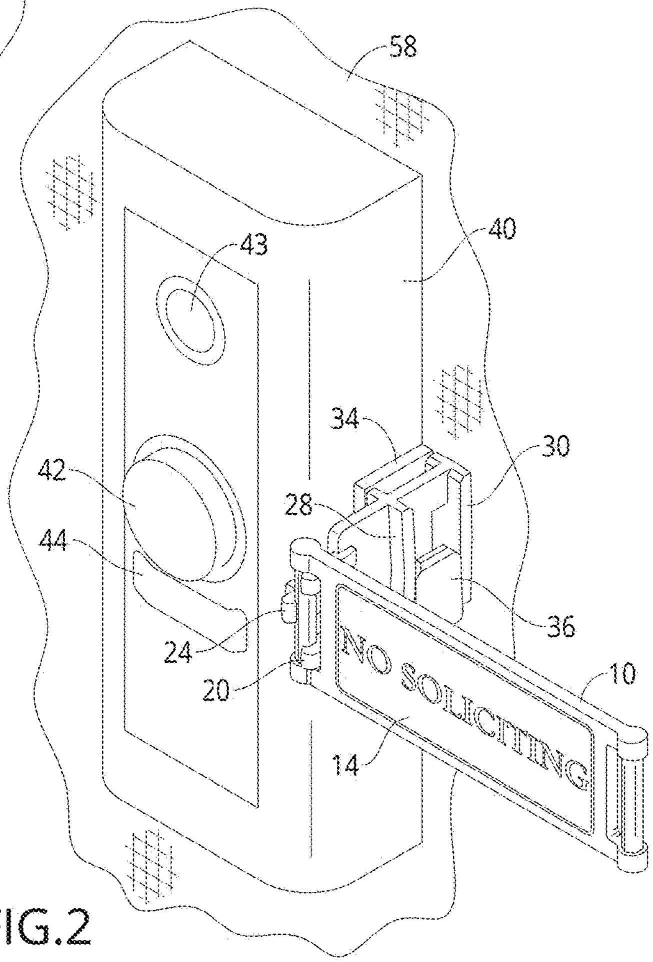
FIG. 2 is a perspective view of an embodiment of a first configuration of a doorbell guard apparatus with sign 10 in an open position, according to aspects of the present invention.

Sign 10 can include a first pin 16 disposed on a first end and a second pin 16 disposed on a second end, opposite of the first end. In embodiments, sign 10 can be affixed to hinge part 18 by inserting pin 16 into the plurality of snap-on tabs. In embodiments, pin is shaped such that movement of sign 10 occurs in a ratcheting fashion. In embodiments, sign 10 can have a plurality of indicia disposed on a plurality of surfaces, such as message 12. In embodiments, the plurality of indicia can convey a message, command, etc., to a user. Ratcheting motion accomplished by the configuration of pin 16 and plurality of snap-on tabs can cause the sign to take a plurality of positions, such as closed, thereby preventing actuation of doorbell 42, (as shown in FIG. 1), open, thereby allowing actuation of doorbell 42 (as shown in FIG. 2), and discrete increments therebetween. In embodiments, sign 10 can be formed of custom ABS plastic having a coating giving it a shiny metallic effect. In embodiments, the custom ABS plastic can be identified by specification number AM10S101. FIG. 2 illustrates a second plurality of indicia, as a message 14, differing from message 12. Advantageously, doorbell guard apparatus provides a simple mechanism for preventing/allowing doorbell actuation.

Figure 3:
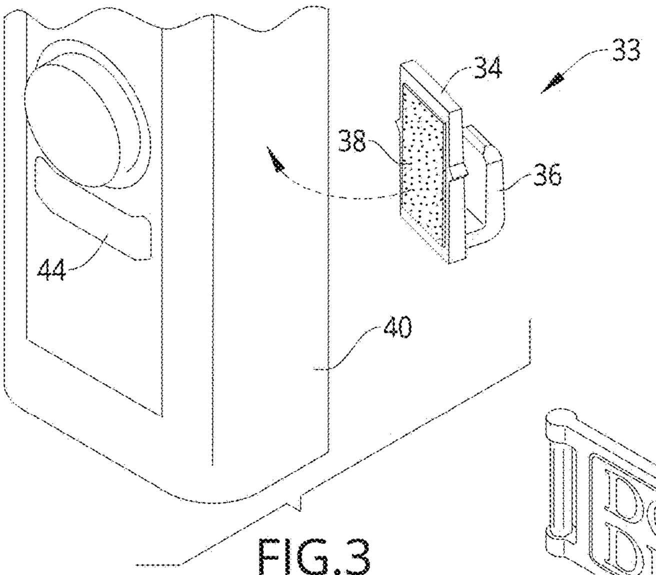
FIG. 3 is a perspective view of an embodiment of a mounting apparatus of doorbell guard apparatus, according to aspects of the present invention.

FIG. 3 illustrates further aspects of anchoring part 33. In embodiments, anchoring part can be continuously formed components such as backing plate 34 and hook 36. In embodiments, backing plate can have a plurality of surfaces, a first of the plurality of surfaces configured to affixed to doorbell 40, and a second of the plurality of surfaces having a portion continuously formed to hook 36. In embodiments, the first surface can include a fastening device 38 configured to fasten anchoring part 33. In embodiments, fastening device 38 can be two-sided tape, a first part of a hook and loop fastener, adhesive, or known fastening devices in the art. In embodiments, the choice of fastening device 38 affects the removability of the apparatus. In embodiments, all or part of anchoring part 33 can be made from clear polycarbonate plastic, which advantageously provides for low visibility of anchoring part 33.

Figure 4:
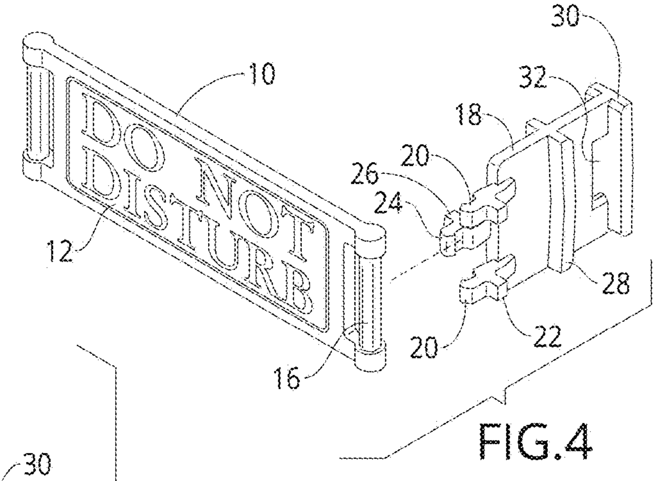
FIG. 4 is a perspective view of an embodiment of sign 10 and hinge 18, according to aspects of the present invention.

FIG. 4 illustrates further aspects of sign 10 and hinge part 18, and more specifically the interconnection of sign 10 to hinge part 18. In embodiments, hinge part can include an aft slot 32 defining a port, or aperture through a portion of hinge part 18 proximate to aft guide plate 30. In embodiments, aft slot 32 is usable in a vertical mounting configuration. In embodiments, sign 10 can snap into the plurality of snap-on tabs, thereby providing secure, but moveable, attachment. In embodiments, pin 16 of sign 10 is shaped as a hexagonal prism, and each of the plurality of snap-on tabs has a recessed portion configured to receive a portion of a hexagonal prism shape. In embodiments, two outer snap-on tabs 20 are disposed on hinge part 18 oriented in a first manner and spaced apart from one another, and a inner snap-on tab 24 is disposed on hinge part 18 oriented in a second manner different from the first and spaced midway between the two outer snap-on tabs. In embodiments, the differing orientations ensure that the plurality of snap-on tabs clasp differing portions of pin 16. Advantageously, the plurality of snap-on tabs have some elasticity such that during ratcheting actuation the tabs move outwardly allow more free movement of sign 10, but once finding a discrete position for sign 10, they return to there default position to provide security.

Figure 5:
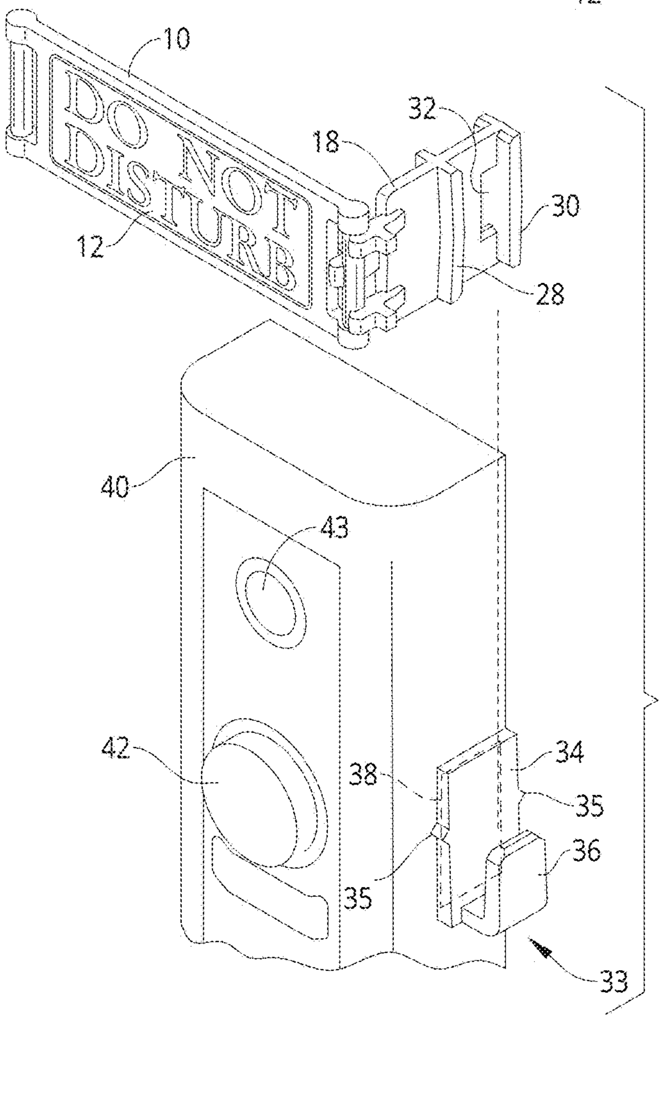
FIG. 5 is a detailed perspective view of an embodiment of a doorbell guard apparatus showing horizontal mounting, according to aspects of the present invention.

FIG. 5 illustrates aspects of horizontal installation of hinge part 30 in anchoring part 33. In embodiments, anchoring part 33 is fastened to doorbell 40 utilizing fastener 38 (as shown in FIG. 3), and sign 10 is fastener to hinge part 18 (as shown in FIG. 4), hinge part can be disposed in anchoring part 33. In embodiments, hinge part 18 can be positioned such that when sliding into anchoring part 33, female mounting interface, such as fore guide plate 28 and aft guide plate 30 form a channel through which hook 16 slides, and, eventually, seats. In embodiments, a distance between fore guide plate 28 and aft guide plate 30 is chosen such that hook 36 forms a friction fit between fore guide plate 28 and aft guide plate 30. Additionally, a distance between hook 36 and backing plate 38 is chosen such that hinge part fits snugly, when seated.

Figure 6:
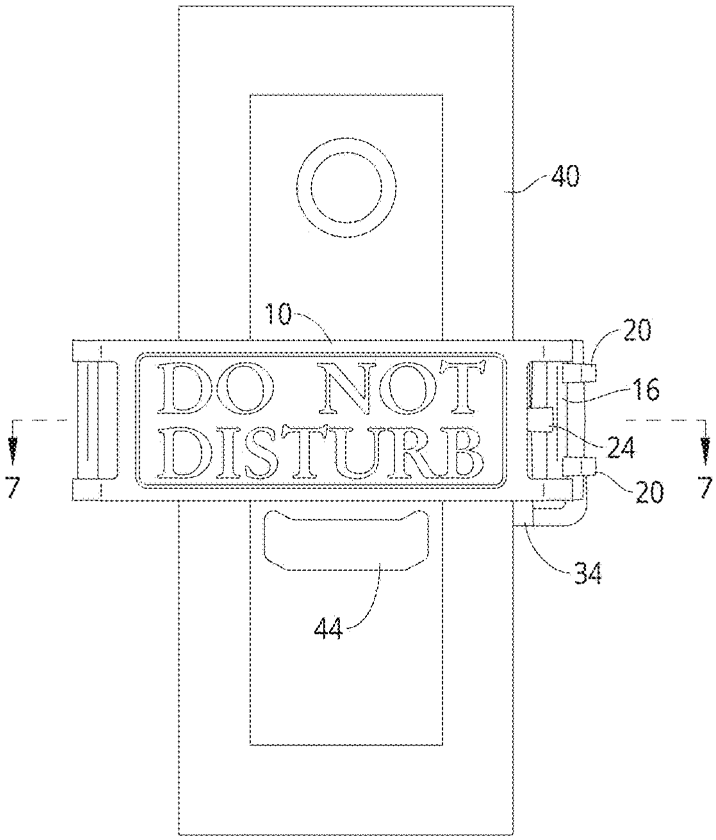
FIG. 6 is a front elevation view of an embodiment of a doorbell guard apparatus, showing sign 10 in a closed position, according to aspects of the present invention.

FIG. 6 illustrates operational aspects of the doorbell guard apparatus. In embodiments, doorbell guard apparatus can be sized such that actuation of sign 10 can block some components without blocking other components. For example, smart doorbell 40 includes a doorbell button 42, a camera 43, and a motion sensor 44. In embodiments, doorbell guard apparatus can be sized such that sign 10, when actuated, block operation of button 42, thereby preventing a alert from being issued, and creating a disturbance, but an still allow smart doorbell to provide motion and video capture. In embodiments, the sign can have a plurality of dimensions, such as a height of 0.900 inches (+/−0.2 inches), and a length between 2.380-2.780 inches. Advantageously, the dimensions of doorbell guard apparatus can be altered, or modify, during manufacture to suit any doorbell configuration.

Figure 8:
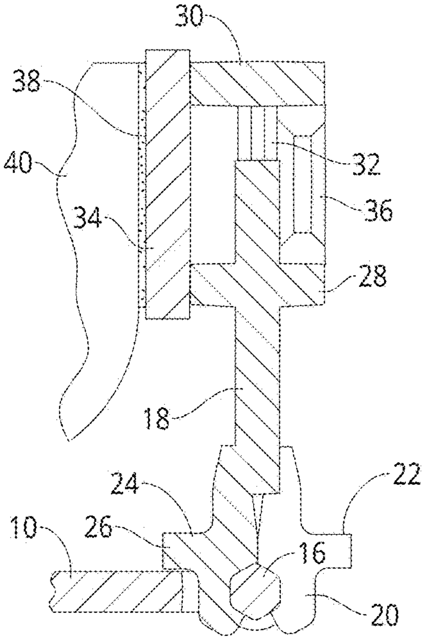
FIG. 8 is a detailed sectional view of portions of an embodiment of a doorbell guard apparatus, according to aspects of the present invention.
Figure 7:
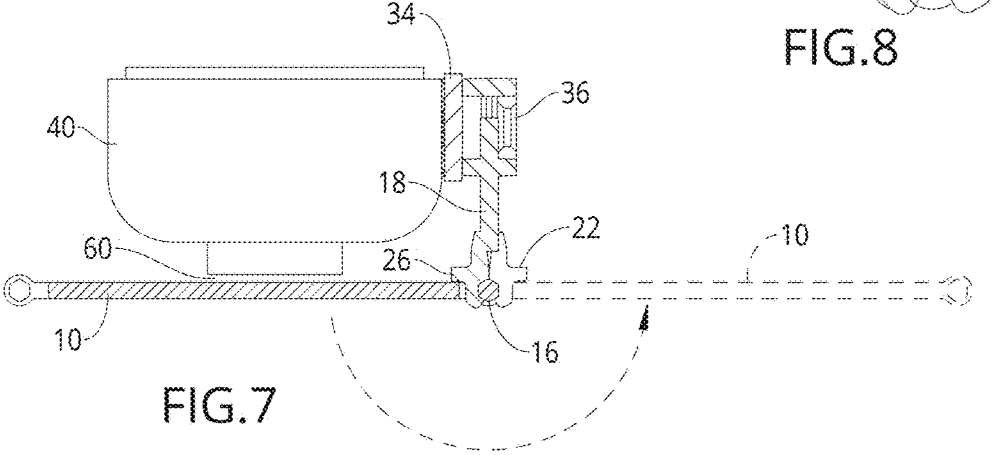
FIG. 7 is a sectional view an embodiment of a doorbell guard apparatus, taken along line 7-7 of FIG. 6, according to aspects of the present invention.

FIG. 7 illustrates operational aspects of hinge part 18 of doorbell guard apparatus. Hinge part 18 is designed to effectuate a ratcheting motion of sign 10 to prevent unintentional, or even, partial movement of sign 10. In embodiments, ratcheting motion is accomplished by a shape of pin 16 and corresponding shape and flexibility of the plurality of snap-on tabs. In embodiments, pin 16 is shaped as a hexagonal prism, but other shapes can be contemplated, such as general prisms, or even cylinders. Additionally, each of the plurality of snap-on tabs has a recessed portion shaped to fit a portion of a perimeter of pin 16 (as illustrated in FIG. 8). For example, in an embodiment where pin 16 is shaped as a hexagonal prism, each of the plurality of snap-on tabs can be shaped to fit a portion of the hexagonal perimeter (as illustrated in FIG. 8). Additionally, the plurality of snap-on tabs are rigidly flexible to support movement and securing of pin 16. Ratcheting motion is accomplished, upon insertion of pin 16 into the plurality of snap-on tabs, by moving sign 10 through any of its range of motion. Upon initial movement the shape of pin 16 forces the plurality of snap-on tabs to deflect outward when not in alignment with the shape of the recessed portions. As sign 10 is moved through an increment, a next alignment between the shape of pin 16 and the shape of the plurality of snap-on tabs is found causing the plurality of snap-on tabs to reset to snap into a secure alignment. Movement in this manner causes discrete positions for sign 10. Additionally, a rotation inner stop 26 can be disposed on one or more of the plurality of snap-on tabs defining a maximum closed position sign 10 can travel, and a rotation outer stop 22 can be disposed on one or more of the plurality of snap-on tabs defining a maximum open position sign 10 can travel. Advantageously, ratcheting motion prevents inadvertent, or incomplete, actuation of sign 10, and/or depressing sign 10 into button either on purpose or by accident.

Figure 9:
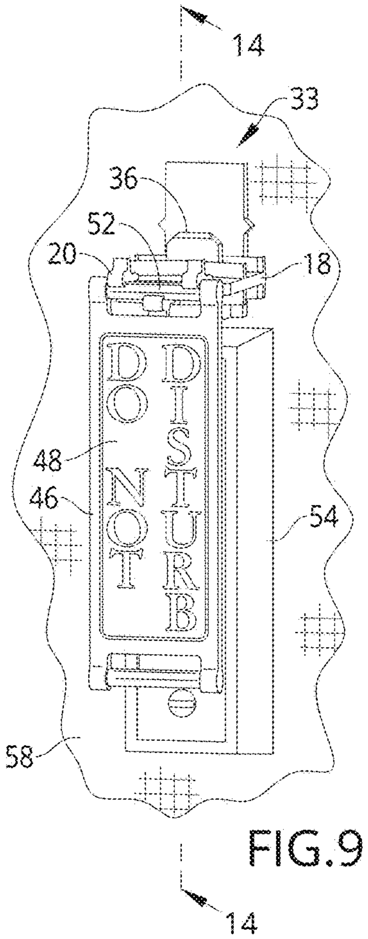
FIG. 9 is a perspective view of an embodiment of a second configuration of a doorbell guard apparatus with sign 46 in a closed position, according to aspects of the present invention.

Referring to FIGS. 9-15, aspects of an embodiment of a doorbell guard apparatus using a vertical configuration are illustrated. FIG. 9 illustrates a vertical configuration of a doorbell guard apparatus installed with a doorbell. In embodiments, a doorbell, such as doorbell 54 can be mounted to a structure 58 and configured to alert an individual of a person's presence. In embodiments, doorbell 54 can be any type of doorbell but includes at least one button 56 for alerting an individual of a person's presence. In embodiments, doorbell 54 can be a traditional chime, or buzzer, doorbell with an audio alert.

Figure 10:
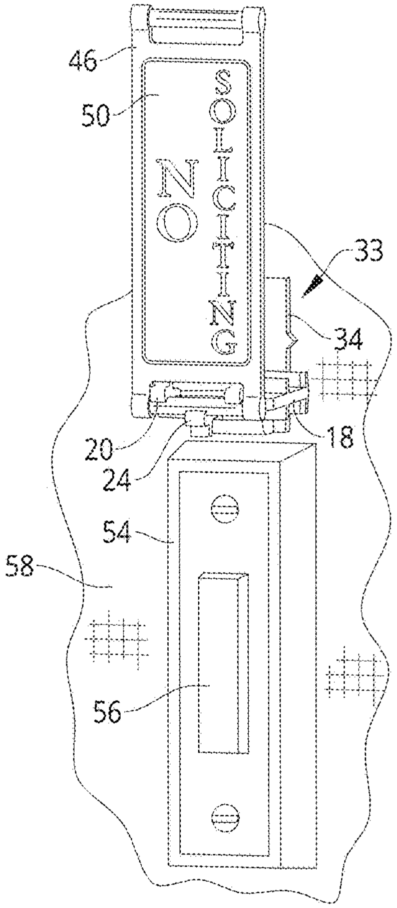
FIG. 10 is a perspective view of an embodiment of a second configuration of a doorbell guard apparatus with sign 46 in an open position, according to aspects of the present invention.

To achieve a vertical configuration aft slot 32 of hinge part 18 can be disposed through hook 36. Additionally, sign 46 having a first plurality of indicia 48 of a plurality of indica disposed thereon, can be secured into the plurality of snap-on tabs of hinge part 18. In embodiments, sign 46 can be actuated to one of a plurality of positions to prevent/allow a user to actuate button 56 of doorbell 54 (as illustrated in FIGS. 9-10). Additionally, at least one surface of a plurality of surfaces of sign 48 can include a plurality of indicia defining at least one message. In embodiments, a first surface of sign 48 includes a first plurality of indicia 48, defining a message, and a second surface of sign 48 includes a second plurality of indicia 50, defining a second message (as illustrated in FIG. 9-10).

In embodiments, doorbell guard apparatus can be sized such that actuation of sign 46 can block some, or all components. For example, doorbell 54 includes a doorbell button 56 only. In embodiments, doorbell guard apparatus can be sized such that sign 46, when actuated, block operation of button 56, thereby preventing a alert from being issued, and creating a disturbance. Advantageously, the dimensions of doorbell guard apparatus can be altered, or modify, during manufacture to suit any doorbell configuration.

Figure 11:
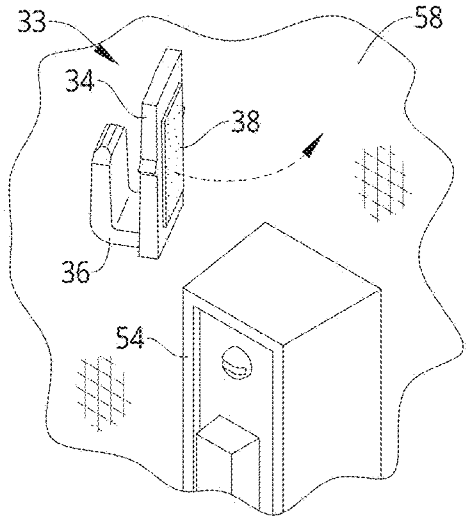
FIG. 11 is a detailed perspective view of an alternative embodiment of a placement of hook 33, according to aspects of the present invention.

FIG. 11 illustrates further aspects of anchoring part 33. In embodiments, anchoring part can be continuously formed components such as backing plate 34 and hook 36. In embodiments, backing plate can have a plurality of surfaces, a first of the plurality of surfaces configured to be affixed proximate to doorbell 54 on surface 58, and a second of the plurality of surfaces having a portion continuously formed to hook 36. In embodiments, the first surface can include a fastening device 38 configured to fasten anchoring part 33. In embodiments, fastening device 38 can be two-sided tape, a first part of a hook and loop fastener, adhesive, or known fastening devices in the art. In embodiments, the choice of fastening device 38 affects the removability of the apparatus.

FIG. 4 illustrates further aspects of sign 46 and hinge part 18, and more specifically the interconnection of sign 46 to hinge part 18. In embodiments, hinge part can include an aft slot 32 defining a port, or aperture through a portion of hinge part 18 proximate to aft guide plate 30. In embodiments, aft slot 32 is usable in a vertical mounting configuration. In embodiments, sign 46 can snap into the plurality of snap-on tabs, thereby providing secure, but moveable, attachment. In embodiments, pin 52 of sign 46 is shaped as a hexagonal prism, and each of the plurality of snap-on tabs has a recessed portion configured to receive a portion of a hexagonal prism shape. In embodiments, two outer snap-on tabs 20 are disposed on hinge part 18 oriented in a first manner and spaced apart from one another, and a inner snap-on tab 24 is disposed on hinge part 18 oriented in a second manner different from the first and spaced midway between the two outer snap-on tabs. In embodiments, the differing orientations ensure that the plurality of snap-on tabs clasp differing portions of pin 16. Advantageously, the plurality of snap-on tabs have some elasticity such that during ratcheting actuation the tabs move outwardly allow more free movement of sign 46, but once finding a discrete position for sign 46, they return to there default position to provide security.

Figure 12:
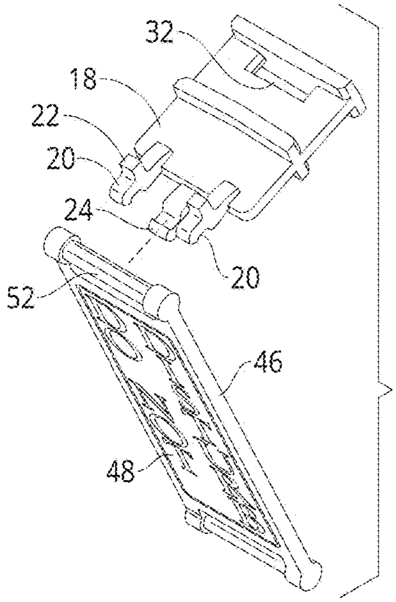
FIG. 12 is an exploded view of an alternate embodiment of sign 46 and hinge 18.
Figure 13:
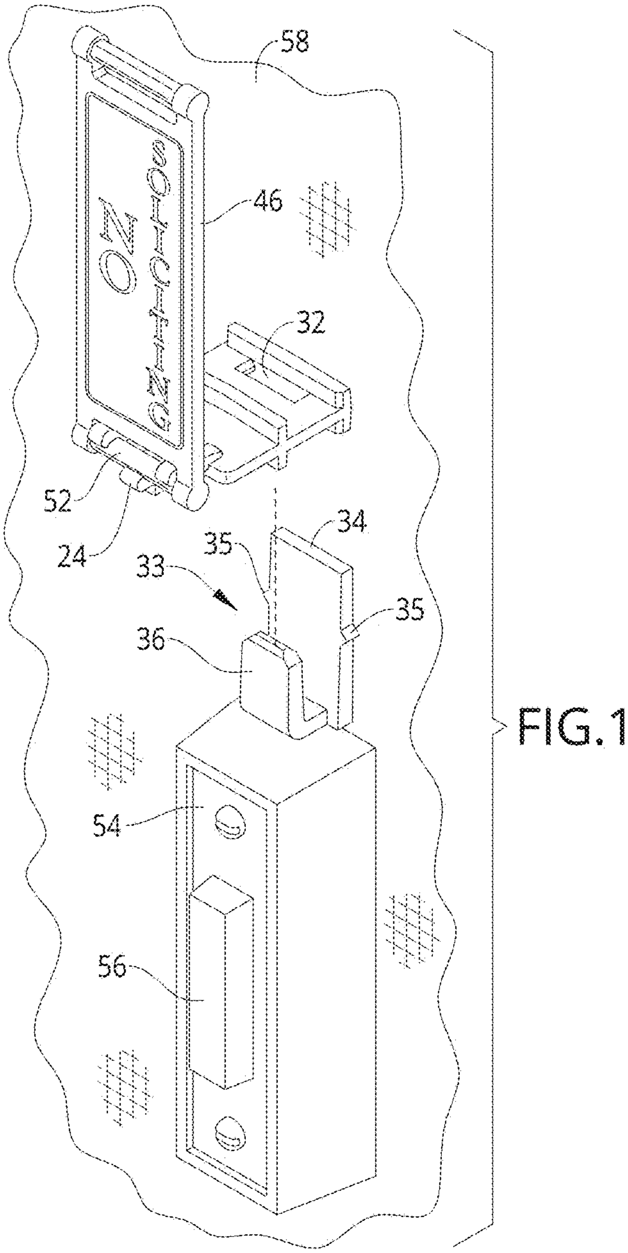
FIG. 13 is a detailed perspective view of a second configuration of a doorbell guard apparatus showing installation, according to aspects of the present invention.

FIG. 13 illustrates aspects of vertical installation of hinge part 18 in anchoring part 33. In embodiments, anchoring part 33 is fastened to structure 58 utilizing fastener 38 (as shown in FIG. 11), and sign 46 is fastener to hinge part 18 (as shown in FIG. 12), hinge part 18 can be disposed in anchoring part 33 by passing hook 36 through aft slot 32. In embodiments, hinge part 18 can be positioned such that when sliding aft slot 32 into hook 36, leveling arrows 35 n be utilize to visually level hinge part 18 in anchoring part 33. In embodiments, dimensions of aft slot 32 are selected to form a snug friction fit with hook 36.

Figure 14:
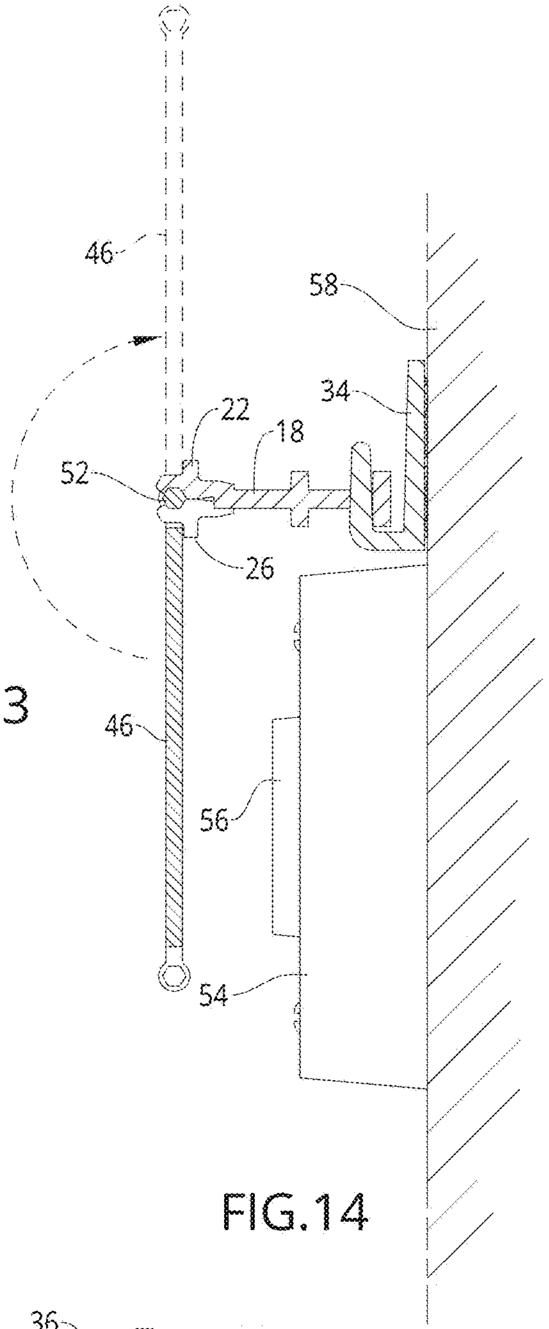
FIG. 14 is a sectional view an embodiment of a doorbell guard apparatus, taken along line 14-14 of FIG. 9, according to aspects of the present invention.
Figure 15:
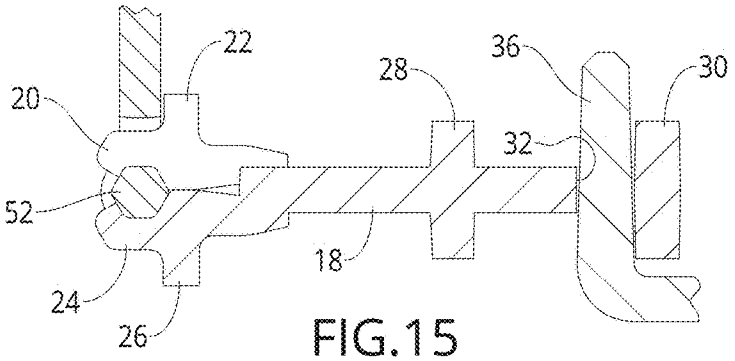
FIG. 15 is a detailed sectional view of portions of an embodiment of a doorbell guard apparatus, according to aspects of the present invention.

FIG. 14 illustrates operational aspects of hinge part 18 of doorbell guard apparatus. Hinge part 18 is designed to effectuate a ratcheting motion of sign 46 to prevent unintentional, or even, partial movement of sign 46. In embodiments, ratcheting motion is accomplished by a shape of pin 52 and corresponding shape and flexibility of the plurality of snap-on tabs. In embodiments, pin 52 is shaped as a hexagonal prism, but other shapes can be contemplated, such as general prisms, or cylindrical shapes. Additionally, each of the plurality of snap-on tabs has a recessed portion shaped to fit a portion of a perimeter of pin 52 (as illustrated in FIG. 15). For example, in an embodiment where pin 52 is shaped as a hexagonal prism, each of the plurality of snap-on tabs can be shaped to fit a portion of the hexagonal perimeter (as illustrated in FIG. 15). Additionally, the plurality of snap-on tabs are rigidly flexible to support movement and securing of pin 52. Ratcheting motion is accomplished, upon insertion of pin 52 into the plurality of snap-on tabs, by moving sign 46 through any of its range of motion. Upon initial movement the shape of pin 52 forces the plurality of snap-on tabs to deflect outward when not in alignment with the shape of the recessed portions. As sign 46 is moved through an increment, a next alignment between the shape of pin 52 and the shape of the plurality of snap-on tabs is found causing the plurality of snap-on tabs to reset to snap into a secure alignment. Movement in this manner causes discrete positions for sign 46. Additionally, a rotation inner stop 26 can be disposed on one or more of the plurality of snap-on tabs defining a maximum closed position sign 46 can travel, and a rotation outer stop 22 can be disposed on one or more of the plurality of snap-on tabs defining a maximum open position sign 46 can travel. Advantageously, ratcheting motion prevents inadvertent, or incomplete, actuation of sign 46.

It should be understood, of course, that the foregoing relates to exemplary embodiments of the invention and that modifications may be made without departing from the spirit and scope of the invention as set forth in the following claims.

What is claimed is:

1. A reconfigurable doorbell guard apparatus, the apparatus comprising:
- a sign;
- a backing plate configured for attachment to a mounting surface relative to a doorbell;
- a fastening element disposed on a rear surface of the backing plate, the fastening element configured so that said attachment is removable without modifying the mounting surface; and
- a hinge assembly coupling the sign to the backing plate so that the sign is movable, during said attachment, between a blocking position obstructing actuation of a doorbell button of the doorbell and a non-blocking position permitting actuation of the doorbell button.

2. The apparatus of claim 1, wherein the hinge assembly is configured to removably interface with the sign.

3. The apparatus of claim 1, wherein the sign comprises opposing display surfaces.

4. The apparatus of claim 1, wherein the fastening element is configured to form said attachment without modification of the doorbell.

5. The apparatus of claim 1, wherein the sign and hinge assembly are formed from plastic.

6. The apparatus of claim 1, wherein the fastening element is flat and maintains a parallel orientation relative to the mounting surface during said attachment.

7. The apparatus of claim 1, wherein the hinge assembly further comprises an attachment interface configured for selectively coupling the hinge assembly in a horizontal orientation and a vertical orientation relative to the doorbell.

8. A reconfigurable doorbell guard apparatus, the apparatus comprising:
- a sign;
- a backing plate configured for removable attachment to a mounting surface relative to a doorbell by a fastening element disposed on a rear surface of the backing plate, and wherein the backing plate is configured to be secured to the mounting surface without mechanically clamping a doorbell housing of the doorbell;
- a hinge assembly coupling the sign to the backing plate, the hinge assembly permitting relative movement between the sign and the backing plate between a first position and a second position.

9. The apparatus of claim 8, the hinge assembly further comprises an attachment interface configured so that the hinge assembly is selectively couplable to the backing plate in a horizonal orientation and a vertical orientation relative to the doorbell.

10. The apparatus of claim 9, wherein, in said horizonal orientation, the second position of the sign is laterally adjacent to the doorbell, and wherein, in said vertical orientation, the second position of the sign is vertically adjacent to the doorbell.

11. The apparatus of claim 10, wherein the first position obstructs operation of the doorbell, and the wherein second position does not obstruct operation of the doorbell.

12. The apparatus of claim 8, wherein the hinge assembly is configured to removably interface with the sign.

13. The apparatus of claim 8, wherein the hinge assembly includes an aperture configured to receive a mounting feature of the backing plate so as to support the vertical orientation.

14. A reconfigurable doorbell guard apparatus, comprising:

a sign;

the backing plate configured for attachment to a mounting surface adjacent a doorbell, a flat fastener disposed on a rear surface of the backing plate, the flat fastener configured to secure the backing plate to the mounting surface so that a flat face of the flat fastener is in a parallel orientation relative to the mounting surface during attachment, and wherein the flat fastener is configured to form the attachment without modification of the mounting surface; and a hinge assembly coupling the sign to the backing plate, the hinge assembly permitting relative movement between the sign and the backing plate.

15. The apparatus of claim 14, the hinge assembly permits the sign to move between a first position and a second position.

16. The apparatus of claim 14, the hinge assembly further comprises an attachment interface configured so that the hinge assembly is selectively couplable to the backing plate in a horizonal orientation and a vertical orientation relative to the doorbell.

17. The apparatus of claim 16, wherein, in said horizonal orientation, the second position of the sign is laterally adjacent to the doorbell, and wherein, in said vertical orientation, the second position of the sign is vertically adjacent to the doorbell.

18. The apparatus of claim 17, wherein the first position obstructs operation of the doorbell, and the wherein second position does not obstruct operation of the doorbell.

19. The apparatus of claim 14, wherein the hinge assembly is configured to removably interface with the sign.

20. The apparatus of claim 16, wherein the hinge assembly includes an aperture configured to receive a mounting feature of the backing plate so as to support the vertical orientation.

* * * * *